United States Patent Office 3,311,667
Patented Mar. 28, 1967

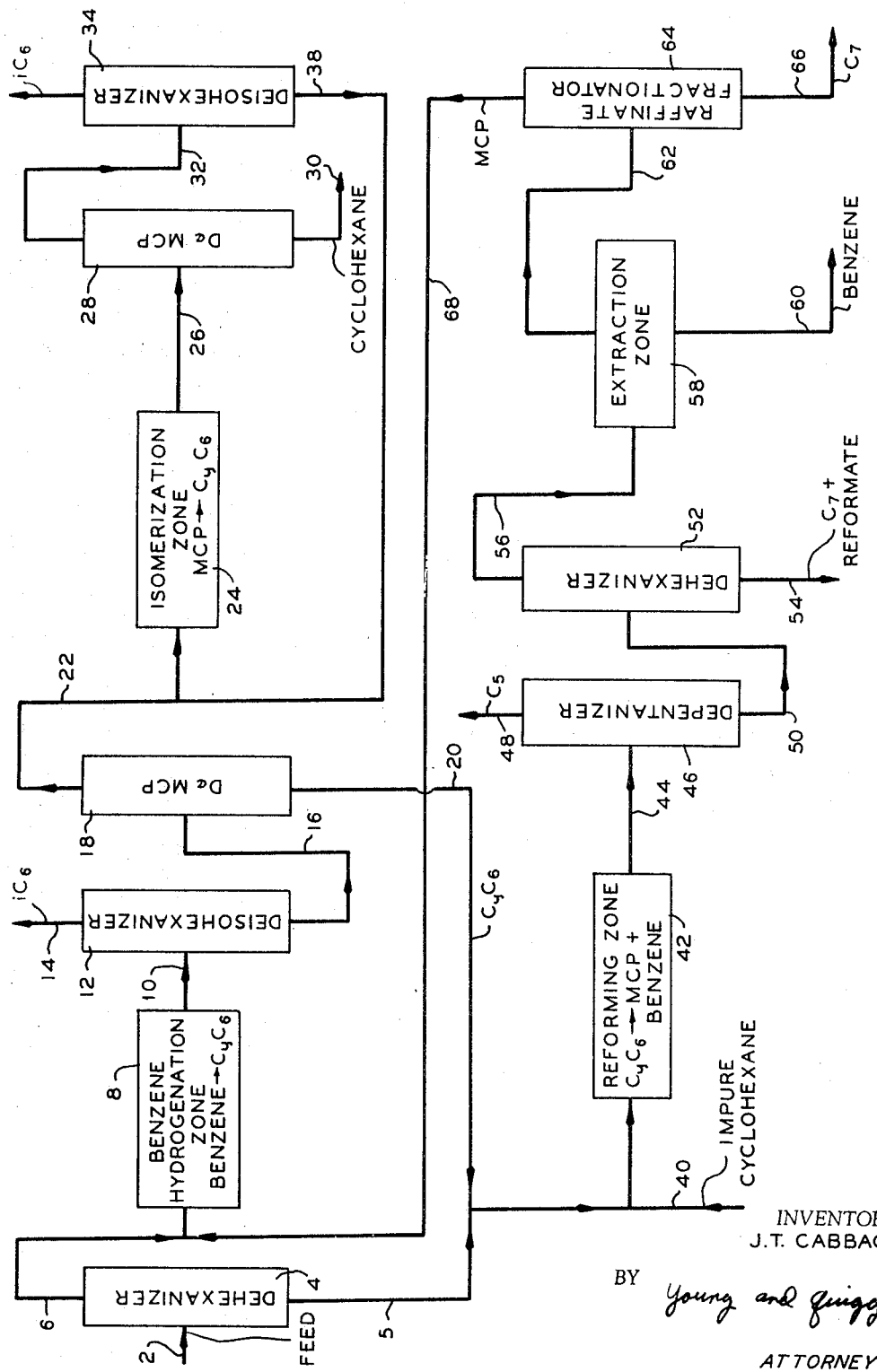

3,311,667
PROCESS FOR THE PREPARATION OF
CYCLOHEXANE
John T. Cabbage, Bartlesville, Okla., assignor to Phillips
Petroleum Company, a corporation of Delaware
Filed May 6, 1963, Ser. No. 278,290
4 Claims. (Cl. 260—667)

This invention relates to a process for the isomerization of methyl-cyclopentane to cyclohexane. In one aspect the invention relates to a process for the removal of benzene from the feed to a methylcyclopentane-ismerization zone. In another aspect the invention relates to a combination hydrogenation, isomerization and reformation operation.

It is well known to isomerize methylcyclopentane-containing streams to cyclohexane in a catalytic isomerization unit. The catalytic isomerization of normally acyclic and alkyl-substituted alicyclic hydrocarbons is carried out at a temperature usually in the range between about 90° F. and 160° F. Various normal acyclic compounds can be isomerized including normal butane, normal pentane, normal hexane, normal heptane, etc. The alkyl-substituted alicyclic compounds which can be isomerized include methylcyclopentane, which is isomerized to cyclohexane, 1,1-dimethylcyclopentane which is converted to methylcyclohexane, and the like. The isomerization reaction is usually carried out under sufficient pressure to provide a liquid phase reaction, namely a pressure in the range between about 150 to about 300 p.s.i.g. with the contact residence time of reactants in the reactor varying usually between about 0.1 and about 5 hours.

The catalyst employed in carrying out isomerization comprises metal halides such as aluminum chloride, aluminum bromide, boron trifluoride and the halides of such metals as zinc, tin, arsenic, antimony, zirconium, beryllium, titanium, iron and the like. These catalysts are especially effective when present as complexes which are formed by interaction between the metal halides and hydrocarbons present in the reaction system. In addition to the catalysts, it is desirable that the corresponding hydrogen halide be present in the reaction zone such that this material maintains catalyst activity at a high level.

However, certain contaminants, particularly benzene and sulfur, when they are present in the feed to isomerization in amounts greater than about 0.1 volume percent and about 20 parts per million, respectively, in the isomerization feed detrimentally affect the catalyst's activity for isomerization. It has heretofore been the practice to pass the feed containing cyclohexane, methylcyclopentane, isohexanes, normal hexane and cyclohexane through various fractionating towers to remove in sequence cyclohexane, isohexanes, and the like. The remaining fraction is then passed through a benzene hydrogenation unit wherein the feed is contacted with a suitable catalyst, e.g., a nickel catalyst on kieselguhr with hydrogen under suitable conditions of elevated temperature, usually between about 360 and about 500° F. Pressure does not appreciably affect the hydrogenation reaction, however, increased pressure shifts the equilibrium toward cyclohexane, and the actual pressure employed is established principally by the partial pressure of the hydrogen. Usually the liquid hourly space velocity is between about 1 and about 3 cubic feet of liquid feed per cubic foot of catalyst per hour. Preferably the hydrogen concentration is such as to provide a hydrogen to benzene mol ratio of between about 4 and about 15 mols per mol. As a result of the preceding operation, benzene is hydrogenated and converted to cyclohexane which is one of the desired products of the isomerization reaction and the sulfur in the feed material reacts with the nickel catalyst converting said catalyst to nickel sulfide.

However, the step preceding the benzene hydrogenation step involving the removal of the isohexanes also results in substantial loss of the benzene with the overhead isohexanes.

It is an object of the invention to provide an improved process for the isomerization of alkyl-substituted alicyclic compounds.

It is another object of the invention to provide an improved process for the removal of benzene from a feed to an isomerization unit wherein methyl cyclopentane is isomerized to cyclohexane.

It is another object of the invention to provide an improved process for a combination of hydrogenation of benzene to cyclohexane, the isomerization of methylcyclopentane to cyclohexane, and the reformation of an impure cyclohexane to methylcyclopentane and benzene.

These and other objects of the invention will be readily apparent to those skilled in the art from the following disclosure, appended drawing and claims.

These objects are broadly accomplished by introducing a feed containing cyclohexane, normal hexane, isohexane, benzene and methylcyclopentane into a benzene-hydrogenation zone wherein said benzene is converted to cyclohexane in the presence of hydrogen, recovering the isohexanes and residual benzene from the hydrogenation zone effluent, removing the cyclohexane from the hydrogenation zone effluent leaving a fraction concentrated in methylcyclopentane which is substantially free of benzene, and passing said fraction to a catalytic isomerization zone wherein said methylcyclopentane is converted to cyclohexane, said catalyst being adversely affected by the presence of benzene in said fraction above that quantity disclosed hereinabove.

In one aspect of the invention, cyclohexane is recovered, along with other close-boiling hydrocarbons, from the benzene-hydrogenation unit effluent and is passed to the reformation unit along with a naturally occurring cyclohexane-containing feed for reformation of the cyclohexane to methylcyclopentane and benzene with the methylcyclopentane being recovered from the reformation unit effluent and the methylcyclopentane being recycled to the benzene-hydrogenation unit.

It has now been discovered that by the fractionation for isohexanes removal from the feed to the isomerization unit subsequent to the benzene-hydrogenation step instead of prior to the benzene-hydrogenation step as has been the conventional practice, an improved yield of cyclohexane is obtained since no benzene is present to be lost in the overhead from the deisohexanizer, which has occurred in the conventional practice.

The drawing is a schematic representation of one embodiment of the invention employing in combination a benzene-hydrogenation zone, an isomerization zone and a reformation zone.

A feed (isohexane to 385° F. end point) containing methylcyclopentane and cyclohexane along with appreciable quantities of isohexanes, normal hexane and benzene is introduced through conduit 2 into a dehexanizer 4. The bottoms, containing substantial quantities of the cyclohexane, along with close boiling hydrocarbon impurities is removed through conduits 5 and passed into a reforming unit 42 subsequently herein described. The overhead from the dehexanizer 4 contains methylcyclopentane, normal hexane, isohexanes, smaller quantities of cyclohexane, and benzene and is passed itno a benzene-hydrogenation unit 8 through conduit 6. In this unit the benzene is hydrogenated to cyclohexane with a suitable catalyst such as hereinbefore described. Heretofore, it has been the practice to fractionate the feed to this hydrogenation unit to remove the isohexanes with an undesired substantial loss of the benzene in the overhead. The effluent from the hydrogenation unit contains principally cyclohexane, normal hexane, methylcyclopentane and isohexanes. These are passed through conduit 10 into a deisohexanizer 12 wherein suitable conditions are maintained for the removal of the isohexanes through conduit 14 in the overhead. Since substantially all the benzene has been hydrogenated to cyclohexane, there will be practically no loss of benzene through conduit 14. Further, if there is any remaining benzene in the hydrogenation effluent, tower 12 will serve to remove it. The bottoms are removed through conduit 16 and passed into a demethylcyclopentanizer 18 wherein the impure cyclohexane remaining from the original feed and that produced by the hydrogenation of benzene is removed as bottoms through conduit 20 and passed into the reforming unit as hereinafter described. The overhead containing principally methylcyclopentane with small quantities of isohexanes and normal hexanes are passed through conduit 22 into the isomerization unit 24. This isomerization unit employs any type of catalyst suitable for the isomerization of methylcyclopentane to cyclohexane, such as an aicd halide fortified aluminum halide catalyst as hereinbefore described, which is detrimentally affected by the presence of benzene in the feed. By the process of this invention, the feed in conduit 22 is substantially free of benzene. Within the isomerization unit 24, the methylcyclopentane is converted to cyclohexane and the normal hexane is converted to isohexanes. The effluent from isomerization unit 24 is passed through conduit 26 into a demethylcyclopentanizer 28 wherein the high purity product cyclohexane is removed as bottoms through conduit 30. The overhead from the demethylcyclopentanizer 28 is removed through conduit 32 and passed into a deisohexanizer 34 wherein the remaining isohexanes and that produced in the isomerization unit are removed through conduit 36. The bottoms, containing principally methylcyclopentane, normal hexane and small quantities of cyclohexane, is recycled through conduit 38 to the feed to the isomerization unit 24.

The feed to the reforming unit comprises the bottoms from the dehexanizer 4 passed through conduit 5, the bottoms from the demethylcyclopentanizer 18 passed through conduit 20 and may include a fresh stream of 85 percent cyclohexane (the remaining 15 percent including methylcyclopentane, dimethylpentanes, trimethylbutane, and heptanes) passed through conduit 40. Within the reforming unit the cyclohexane is reformed into methylcyclopentane and benzene employing any suitable type of catalyst such as Platforming catalyst, a platinum-type catalyst. A particularly suitable catalyst is platinum-alumina promoted with fluorine. The temperature is maintained within the range of 850° F. to 980° F. and the pressure within the range of 280 to 800 p.s.i. The effluent from the reforming unit 42 is removed through conduit 44 and passed into a depentanizer 46 wherein the $C_5$'s and lighter are removed overhead through conduit 48. The bottoms from the depentanizer are passed through conduit 50 into a dehexanizer 52. The $C_7$'s and heavier from the reforming unit 42 are removed through conduit 54. The overhead from the dehexanizer 52 is passed through conduit 56 into a suitable means for the separation of benzene therefrom. In one suitable means, the overhead is passed into a solvent extraction unit 58 (such as the Udex unit) employing triethylene glycol as a solvent under conditions of a pressure of about 135 p.s.i.g. and a temperature of 220° F. to 300° F. The benzene is removed in the extract phase through conduit 60 and is a salable and valuable product. The raffinate is removed through conduit 62 and passed into a raffinate fractionator 64 with the remaining $C_7$'s and heavier being removed as bottoms through conduit 66. The overhead, which is mainly methylcyclopentane but containing a small portion of benzene, is then recycled through conduit 68 to the benzene-hydrogenation feed. This feed will contain extremely small quantities of benzene but these amounts are sufficient to adversely affect the catalyst in the isomerization unit and must, therefore, be hydrogenated or otherwise removed prior to passage of the methylcyclopentane into the isomerization unit.

The location of the deisohexanizer 12 and the demethylcyclopentanizer 18 serves a dual purpose other than the removal of benzene as hereinbefore discussed. Methylcyclopentane is, of course, the desired feed stock to the cyclohexane producing system (namely, the isomerization unit 24) and natural cyclohexane-containing hydrocarbon (containing impurities boiling at about the same temperature as cyclohexane, and not separable therefrom by fractionation) is the desired feed stock to the benzene producing system (namely, the reforming unit 42). Both products are relatively high value materials. Normal hexane cannot be completely removed from methylcyclopentane feed stream by fractionation because its volatility is very near the volatility of methylcyclopentane. Therefore, normal hexane is included in the isomerization feed stream up to the capacity of the reaction system, and its inclusion results in the production of the valuable by-products isohexanes. The towers 12 and 34 operate primarily to remove the natural and synthetic isohexanes from the reaction system and secondarily to remove enough normal hexane to keep the load on the reaction system below its capacity.

The invention is illustrated by the following example.

*Example*

A feed stream comprising principally isohexanes, normal hexane, methylcyclopentane, benzene, cyclohexane, smaller amounts of pentane and lighter, and isoheptanes and heavier, is fed through conduit 2 into the dehexanizer 4. This feed has an end point of 300° F. The flow is as described above for the drawing with the conventional benzene hydrogenation catalyst being nickel on kieselguhr with a pressure of 405 p.s.i.g. and a temperature of 380 to 490° F. The deisohexanizer is operated at a pressure of 40 p.s.i.g. and a temperature of 200° F. and 242° F., overhead and kettle products, respectively. The demethylcyclopentanizer 18 is operated at a top temperature of 233° F. and bottom of 274° F. and a pressure of 31 p.s.i.g. The isomerization unit 24 employs a hydrogen chloride fortified aluminum chloride-hydrocarbon complex catalyst and is maintained at an inlet temperature of 80° F. and an outlet temperature of 140° F., and a pressure of 150 p.s.i.g. The reforming unit 42 employs a Platformate (platinum on alumina) catalyst and a temperature of 900° F. and a pressure of 500 p.s.i.g. The solvent employed in the extraction unit 58 is triethylene glycol with a temperature of 218° F. The feed through conduit 40 is 85 percent cyclohexane (the remainder being dimethylpentanes, MCP, and $C_7$'s).

A material balance of the streams is shown in the accompanying table.

TABLE.—STREAM COMPOSITIONS IN BARRELS PER DAY

| | 6 | 68 | 6+68 | 10 | 14 | 16 | 22 | 20 | 38 | 22+38 | 26 | 30 | 32 |
|---|---|---|---|---|---|---|---|---|---|---|---|---|---|
| Normal Pentane and lighter | 96 | 28 | 124 | 124 | 124 | | | | | | | | |
| Isohexane | 2,765 | 390 | 3,155 | 3,155 | 2,740 | 415 | 351 | 64 | 93 | 444 | 1,842 | | 1,842 |
| Normal Hexane | 3,156 | 338 | 3,494 | 3,494 | 1,242 | 2,252 | 2,207 | 45 | 589 | 2,796 | 1,398 | | 1,398 |
| Methycyclopentane | 1,151 | 906 | 2,057 | 2,057 | 242 | 1,815 | 1,755 | 60 | 616 | 2,371 | 711 | | 711 |
| Benzene | 479 | 10 | 489 | | | | | | | | | | |
| Cyclohexane | 594 | 22 | 616 | 1,211 | | 1,211 | | 35 | 1,176 | 101 | 1,761 | [1] 1,695 | 66 |
| Isoheptanes | 44 | 64 | 108 | 108 | | 108 | | | 108 | | | | |
| Normal Heptane and heavier | 157 | 128 | 285 | 285 | | 285 | | | 285 | | | | |
| | 8,442 | 1,886 | 10,328 | 10,434 | 4,348 | 6,086 | 4,348 | 1,738 | 1,364 | 5,712 | 5,712 | 1,695 | 4,017 |

[1] 99.8 percent purity (contains 0.2 percent dimethylpentanes).

While various compositions, structures, processes and apparatus have been shown for purposes of illustration, the invention is not limited to these. Variation and modification within the scope of the disclosure and the claims can readily be effected by those skilled in the art.

I claim:

1. A process for the removal of benzene from a feed to an isomerization zone comprising introducing a feed containing cyclohexane, isohexanes, benzene and methylcyclopentane into a benzene-hydrogenation zone wherein said benzene is converted to cyclohexane, recovering isohexanes and residual benzene from the hydrogenation zone effluent, recovering a fraction concentrated in methylcyclopentane and substantially free of benzene from the hydrogenation zone effluent, and passing said fraction to a catalytic isomerization zone wherein said methylcyclopentane is converted to cyclohexane, said isomerization catalyst being adversely affected by the presence of benzene in said fraction.

2. A combination hydrogenation and isomerization process for a feed containing cyclohexane, at least 33 volume percent isohexanes, benzene and methylcyclopentane comprising introducing said feed into a benzene-hydrogenation zone wherein said benzene is converted to cyclohexane, recovering a first fraction containing isohexanes and residual benzene from the hydrogenation zone effluent by fractionation leaving a second fraction concentrated in methylcyclopentane and cyclohexane, recovering methylcyclopentane from said second fraction by fractionation, passing said thus-recovered methylcyclopentane to a catalytic isomerization zone wherein said methylcyclopentane is converted to cyclohexane, said catalyst being adversely affected by the presence of benzene in the feed, and recovering said cyclohexane from the isomerization zone effluent.

3. A combination hydrogenation, isomerization and reforming process for a feed comprising cyclohexane, isohexanes, benzene and methylcyclopentane which comprises recovering from said feed a first fraction concentrated in cyclohexane leaving a second fraction containing at least 33 volume percent isohexanes, methylcyclopentane and benzene, passing said second fraction directly into a benzene-hydrogenation zone wherein substantially all the benzene is converted to cyclohexane, recovering isohexanes and residual benzene from the hydrogenation zone effluent by fractionation in a first fractionation zone, recovering a third fraction containing methylcyclopentane and cyclohexane from said first fractionation zone, recovering a fourth fraction concentrated in cyclohexane from said third fraction leaving a fifth fraction concentrated in methylcyclopentane, passing said fifth fraction through a catalytic isomerization zone wherein said methylcyclopentane is converted to cyclohexane, said catalyst being adversely affected by the presence of benzene in the feed, recovering cyclohexane product from the isomerization zone effluent, passing said first fraction and said fourth fraction together through a reforming zone wherein said cyclohexane is converted to methylcyclopentane and benzene, recovering benzene from the reforming zone effluent by solvent extraction, recovering a sixth fraction concentrated in methylcyclopentane and containing some benzene from said reforming zone effluent, and passing said sixth fraction to said hydrogenation zone along with said second fraction.

4. The process of claim 3 wherein in addition to passing said first and fourth fractions through said reforming zone, an impure cyclohexane fraction is also passed through said reforming zone.

References Cited by the Examiner

UNITED STATES PATENTS 3,248,438   4/1966   Kron _____ 260—666
3,250,816   5/1966   Waldby _____ 260—666
3,250,819   5/1966   Cabbage _____ 260—666

DELBERT E. GANTZ, *Primary Examiner.*

S. P. JONES, *Assistant Examiner.*